United States Patent [19]
Halila

[11] Patent Number: 5,363,643
[45] Date of Patent: Nov. 15, 1994

[54] SEGMENTED COMBUSTOR
[75] Inventor: Ely E. Halila, Cincinnati, Ohio
[73] Assignee: General Electric Company, Cincinnati, Ohio
[21] Appl. No.: 14,949
[22] Filed: Feb. 8, 1993
[51] Int. Cl.$^5$ .............................. F02C 7/20; F02G 3/00
[52] U.S. Cl. ................................. 60/39.31; 60/39.32; 60/752
[58] Field of Search ................... 60/39.31, 39.32, 752, 60/753, 754, 760; 431/154, 350, 353

[56] References Cited
U.S. PATENT DOCUMENTS

| | | | |
|---|---|---|---|
| 3,307,354 | 3/1967 | Macaulay et al. | 60/39.31 |
| 4,173,118 | 11/1979 | Kawaguchi | 60/39.65 |
| 4,194,358 | 3/1980 | Stenger | 60/39.06 |
| 4,374,466 | 2/1983 | Sotheran | 60/39.36 |
| 4,422,300 | 12/1983 | Dierberger et al. | 60/754 |
| 4,471,623 | 9/1984 | Griffin | 60/39.31 |
| 4,480,436 | 11/1984 | Maclin | 60/39.32 |
| 4,567,730 | 2/1986 | Scott | 60/757 |
| 4,848,089 | 7/1989 | Cramer | 60/39.32 |
| 4,854,122 | 8/1989 | Belling | 60/39.32 |
| 4,944,151 | 7/1990 | Hovnanian | 60/39.32 |
| 5,069,034 | 12/1991 | Jourdain et al. | 60/39.31 |
| 5,113,660 | 5/1992 | Able et al. | 60/753 |

OTHER PUBLICATIONS

Jones, "Advanced Technology for Reducing Aircraft Engine Pollution," Nov. 1974, Transactions of the ASME, Serie B: Journal of Engineering for Industry, pp.: 1354–1360.

Primary Examiner—Richard A. Bertsch
Assistant Examiner—Howard R. Richman
Attorney, Agent, or Firm—Jerome C. Squillaro; Charles L. Moore, Jr.

[57] ABSTRACT

A combustor liner segment includes a panel having four sidewalls forming a rectangular outer perimeter. A plurality of integral supporting lugs are disposed substantially perpendicularly to the panel and extend from respective ones of the four sidewalls. A plurality of integral bosses are disposed substantially perpendicularly to the panel and extend from respective ones of the four sidewalls, with the bosses being shorter than the lugs. In one embodiment, the lugs extend through supporting holes in an annular frame for mounting the liner segments thereto, with the bosses abutting the frame for maintaining a predetermined spacing therefrom.

19 Claims, 10 Drawing Sheets

SEGMENTED COMBUSTOR

This invention herein described was made in the performance of work under a NASA contract and is subject to the provisions of Section 305 of the National Aeronautics and Space Act of 1958, Public Law 85-568 (72 Stat. 435; 42 USC 2457).

The present invention relates generally to gas turbine engines, and, more specifically, to a low $NO_x$ combustor therein.

CROSS REFERENCE TO RELATED APPLICATIONS

The present invention is related to concurrently filed patent applications Ser. No. 08/014,887, entitled "Low $NO_x$ Combustor," docket 13DV-11199; Ser. No. 08/014,886, entitled "Combustor Liner Support Assembly," docket 13DV-11327; and Ser. No. 08/014,923, entitled "Liner Mounting Assembly," docket 13DV-11379, all by the same inventor and assignee.

BACKGROUND OF THE INVENTION

In a gas turbine engine, a fuel and air mixture is ignited for generating combustion gases from which energy is extracted for producing power, such as thrust for powering an aircraft in flight. In one aircraft designated High Speed Civil Transport (HSCT), the engine is being designed for powering the aircraft at high Mach speeds and high altitude conditions. And, reduction of exhaust emissions from the combustion gases is a primary objective for this engine.

More specifically, conventionally known oxides of nitrogen, i.e. $NO_x$, are environmentally undesirable and the reduction thereof from aircraft gas turbine engines is desired. It is known that $NO_x$ emissions increase when cooling air is injected into the combustion gases during operation. However, it is difficult to reduce the amount of cooling air used in a combustor since the combustor itself is typically made of metals requiring suitable cooling in order to withstand the high temperatures of the combustion gases.

In a typical gas turbine engine, a compressor provides compressed air which is mixed with fuel in the combustor and ignited for generating combustion gases which are discharged into a conventional turbine which extracts energy therefrom for powering, among other things, the compressor. In order to cool the combustor, a portion of the air compressed in the compressor is bled therefrom and suitably channeled to the various parts of the combustor for providing various types of cooling thereof including conventional film cooling and impingement cooling. However, any air bled from the compressor which is not used in the combustion process itself decreases the overall efficiency of the engine, but, nevertheless, is typically required in order to suitably cool the combustor for obtaining a useful life thereof.

One conventionally known, advanced combustor design utilizes non-metallic combustor liners which have a higher heat temperature capability than the conventional metals typically utilized in a combustor. Non-metallic combustor liners may be conventionally made from conventional Ceramic Matrix Composite (CMC) materials such as that designated Nicalon/Silicon Carbide (SIC) available from Dupont SEP; and conventional carbon/carbon (C/C) which are carbon fibers in a carbon matrix being developed for use in high temperature gas turbine environments. However, these non-metallic materials typically have thermal coefficients of expansion which are substantially less than the thermal coefficients of expansion of conventional superalloy metals typically used in a combustor from which such non-metallic liners must be supported.

Accordingly, during the thermal cycle operation inherent in a gas turbine engine, the various components of the combustor expand and contract in response to heating by the combustion gases, which expansion and contraction must be suitably accommodated without interference in order to avoid unacceptable thermally induced radial interference loads between the combustor components which might damage the components or result in an unacceptably short useful life thereof. Since the non-metallic materials are also typically relatively brittle compared to conventional combustor metallic materials, they have little or no ability to deform without breakage. Accordingly, special arrangements must be developed for suitably mounting non-metallic materials in a conventional combustor in order to prevent damage thereto from radial interference during thermal cycles and for obtaining a useful life thereof.

Since non-metallic materials being considered for use in a combustor have higher temperature capability than conventional combustor metals, they may be substantially imperforate without using typical film cooling holes therethrough, which therefore reduces the need for bleeding compressor cooling air, with the eliminated film cooling air then reducing $NO_x$ emissions since such air is no longer injected into the combustion gases downstream from the introduction of the original fuel/air mixture. However, it is nevertheless desirable to cool the back sides of the non-metallic materials in the combustor, with a need, therefore, for discharging the spent cooling air into the flowpath without increasing $NO_x$ emissions from the combustion gases.

Furthermore, the various components of a conventional combustor must also typically withstand differential axial pressures thereon, and vibratory response without adversely affecting the useful life of the components. This provides additional problems in mounting non-metallic materials in the combustor since such mounting must also accommodate pressure loads and vibration of the components in addition to accommodating thermal expansion and contraction thereof.

SUMMARY OF THE INVENTION

A combustor liner segment includes a panel having four sidewalls forming a rectangular outer perimeter. A plurality of integral supporting lugs are disposed substantially perpendicularly to the panel and extend from respective ones of the four sidewalls. A plurality of integral bosses are disposed substantially perpendicularly to the panel and extend from respective ones of the four sidewalls, with the bosses being shorter than the lugs. In one embodiment, the lugs extend through supporting holes in an annular frame for mounting the liner segments thereto, with the bosses abutting the frame for maintaining a predetermined spacing therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
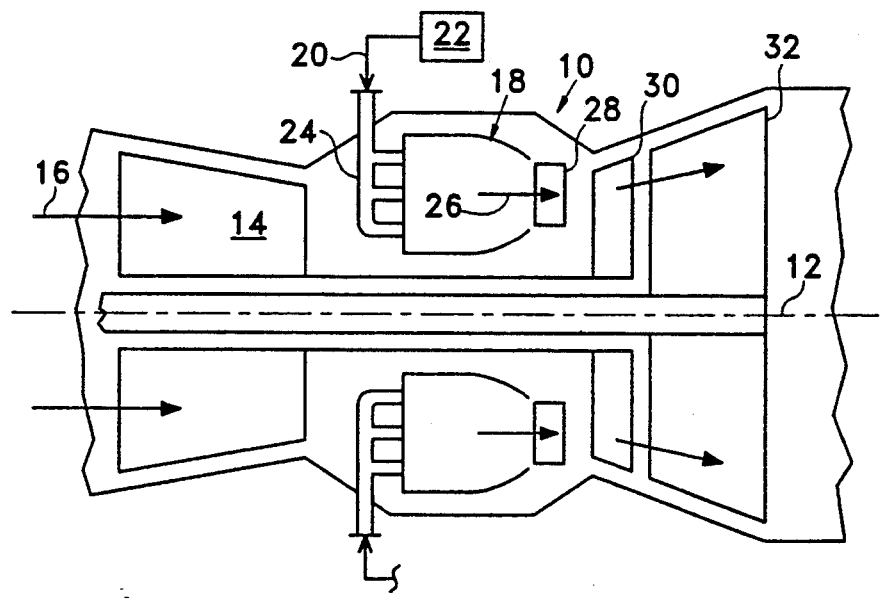
FIG. 1 is a schematic, longitudinal sectional view of a portion of a gas turbine engine including an annular combustor in accordance with one embodiment of the present invention.

Illustrated schematically in FIG. 1 is a portion of an exemplary gas turbine engine 10 having a longitudinal or axial centerline axis 12. The engine 10 is configured for powering a High Speed Civil Transport (HSCT) at high Mach numbers and at high altitude with reduced oxides of nitrogen ($NO_x$) in accordance with one objective of the present invention. The engine 10 includes, inter alia, a conventional compressor 14 which receives air 16 which is compressed therein and conventionally channeled to a combustor 18 effective for reducing $NO_x$ emissions. The combustor 18 is an annular structure disposed coaxially about the centerline axis 12 and is conventionally provided with fuel 20 from a conventional means 22 for supplying fuel which channels the fuel 20 to a plurality of circumferentially spaced apart fuel injectors 24 which inject the fuel 20 into the combustor 18 wherein it is mixed with the compressed air 16 and conventionally ignited for generating combustion gases 26 which are discharged axially downstream from the combustor 18 into a conventional high pressure turbine nozzle 28, and, in turn, into a conventional high pressure turbine (HPT) 30. The HPT 30 is conventionally joined to the compressor 14 through a conventional shaft, with the HPT 30 extracting energy from the combustion gases 26 for powering the compressor 14. A conventional power or low pressure turbine (LPT) 32 is disposed axially downstream from the HPT 30 for receiving therefrom the combustion gases 26 from which additional energy is extracted for providing output power from the engine 10 in a conventionally known manner.

Figure 2:
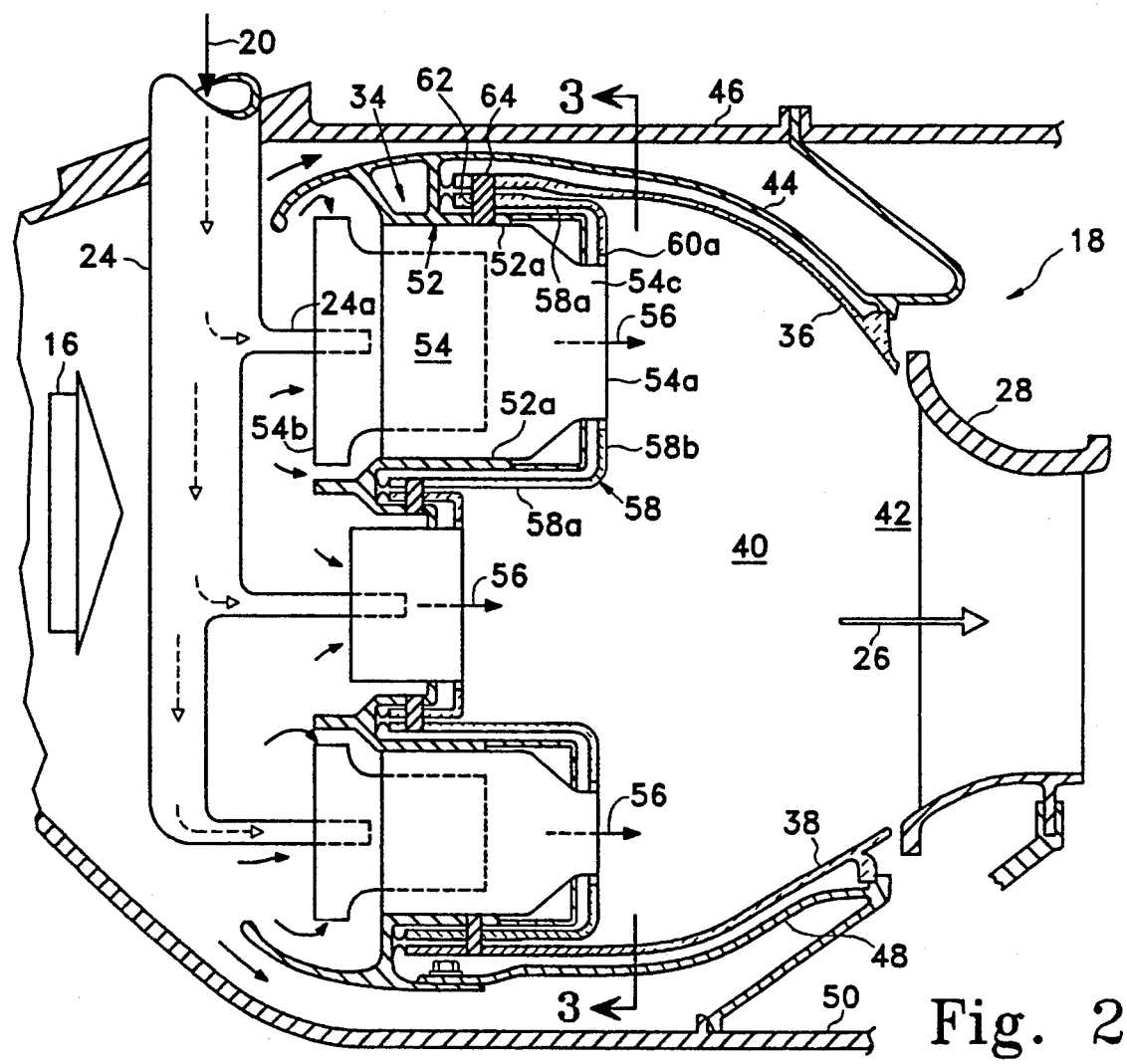
FIG. 2 is an enlarged schematic view of the top portion of the combustor shown in FIG. 1 illustrating an exemplary triple dome assembly including heat shields and pin-mounted combustor liners.

Illustrated in more detail in FIG. 2 is the upper portion of the combustor 18 of FIG. 1 which includes at its upstream end an annular structural dome assembly 34 to which are joined an annular radially outer liner 36 and an annular radially inner liner 38. The inner liner 38 is spaced radially inwardly from the outer liner 36 to define therebetween an annular combustion zone 40, with downstream ends of the outer and inner liners 36, 38 defining therebetween a combustor outlet 42 for discharging the combustion gases 26 therefrom and into the nozzle 28. In the exemplary embodiment illustrated in FIG. 2, the dome assembly 34 includes a radially outer, annular supporting frame 44 conventionally joined to an annular outer casing 46, and a radially inner, annular supporting frame 48 conventionally fixedly joined to an annular, radially inner casing 50. The dome assembly 34 may be otherwise conventionally supported to the outer and inner casings 46, 50 as desired.

In the exemplary embodiment illustrated in FIG. 2, the dome assembly 34 and the outer and inner frames 44, 48 are made from conventional metallic combustor materials typically referred to as superalloys. Such superalloys have relatively high temperature capability to withstand the hot combustion gases 26 and the various pressure loads, including axial loads, which are carried thereby due to the high pressure air 16 from the compressor 14 acting on the dome assembly 34, and on the liners 36, 38.

In a conventional combustor, conventional metallic combustion liners would extend downstream from the dome assembly 34, with each liner including a plurality of conventional film cooling apertures therethrough which are supplied with a portion of the compressed air 16 for cooling the liners, with the spent film cooling air then being discharged into the combustion zone 40 wherein it mixes with the combustion gases 26 prior to discharge from the combustor outlet 42. An additional portion of the cooling air 16 is also conventionally used for cooling the dome assembly 34 itself, with the spent cooling air also being discharged into the combustion gases 26 prior to discharge from the outlet 42. Bleeding a portion of the compressed air 16 from the compressor 14 (see FIG. 1) for use in cooling the various components of a combustor necessarily reduces the available air which is mixed with the fuel 20 and undergoes combustion in the combustion zone 40 which, in turn, decreases the overall efficiency of the engine 10. Furthermore, any spent cooling air 16 which is reintroduced into the combustion zone 40 and mixes with the combustion gases 26 therein prior to discharge from the outlet 42 typically increases nitrogen oxide ($NO_x$) emissions from the combustor 18 as is conventionally known.

For the HSCT application described above, it is desirable to reduce the amount of the air 16 bled from the compressor 14 for cooling purposes, and to also reduce the amount of spent cooling air injected into the combustion gases 26 prior to discharge from the combustor outlet 42 for significantly reducing $NO_x$ emissions over a conventionally cooled combustor.

In accordance with one object of the present invention, the outer and inner liners 36, 38 are preferably non-metallic material effective for withstanding heat from the combustion gases 26 and are also preferably substantially imperforate and characterized by the absence of film cooling apertures therein for eliminating the injection of spent film cooling air into the combustion gases 26 prior to discharge from the outlet 42 for reducing $NO_x$ emissions and also allowing higher temperature combustion within the combustion zone 40. Conventional non-metallic combustor liner materials are known and include conventional Ceramic Matrix Composites (CMC) materials and carbon/carbon (C/C) as described above. These non-metallic materials have high temperature capability for use in a gas turbine engine combustor, but typically have low ductility and, therefore, require suitable support in the combustor 18 for accommodating pressure loads, vibratory response, and differential thermal expansion and contraction relative to the metallic dome assembly 34 for reducing stresses therein and for obtaining a useful effective life thereof.

Since conventional non-metallic combustor materials have a coefficient of thermal expansion which is substantially less than the coefficient of thermal expansion of metallic combustor materials such as those forming the dome assembly 34, the liners 36, 38 must be suitably joined to the dome assembly 34, for example, for allowing unrestricted or unrestrained thermal expansion and contraction movement relative to the dome assembly 34 to prevent or reduce thermally induced loads therefrom.

Furthermore, the metallic dome assembly 34 itself must also be suitably protected from the increased high temperature combustion gases 26 within the combustion zone 40 which are realizable due to the use of the non-metallic liners 36, 38.

Referring again to FIG. 2, the dome assembly 34 includes at least one or a first annular dome 52 having a pair of axially extending and radially spaced apart first flanges 52a between which are suitably fixedly joined to the first dome 52 a plurality of circumferentially spaced apart first carburetors 54 which are effective for discharging from respective first outlets 54a thereof a fuel/air mixture 56. In the preferred embodiment illustrated in FIG. 2, the dome assembly 34 is a triple dome assembly with the top and bottom domes providing main combustion and the center dome providing pilot combustion, but may include one or more domes as desired.

Figure 3:
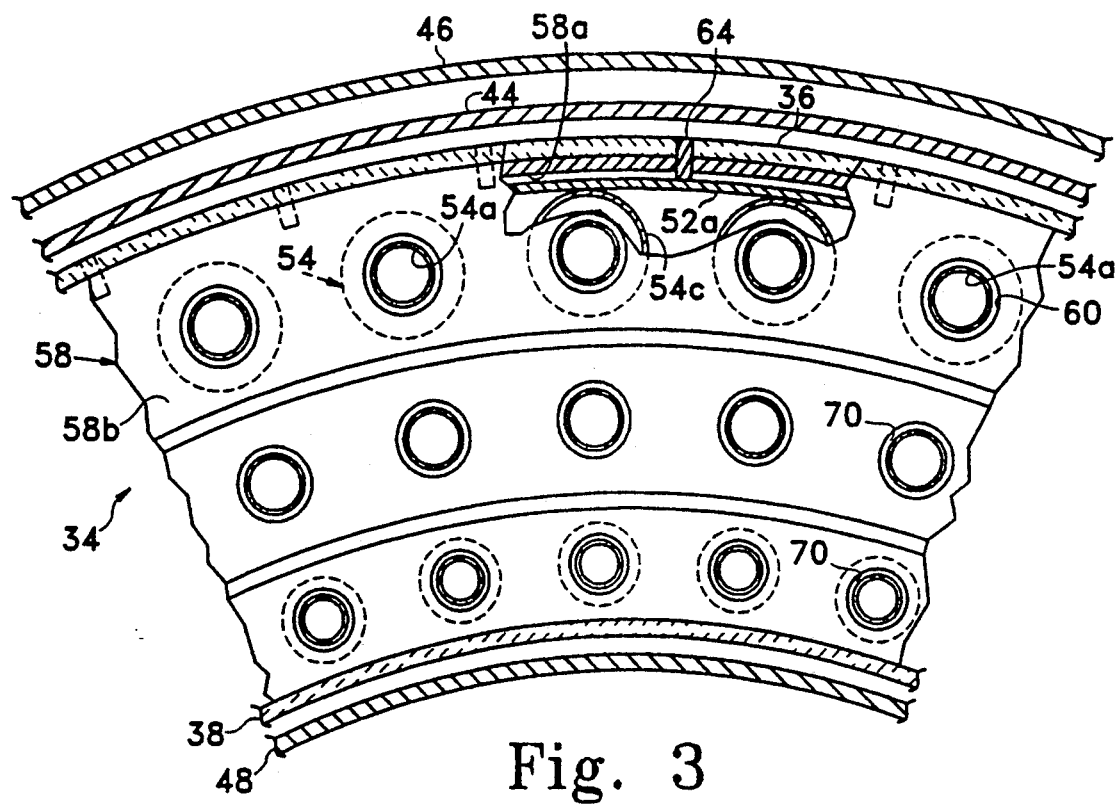
FIG. 3 is an upstream facing, partly sectional view of the combustor illustrated in FIG. 2 taken generally along line 3—3.

Each of the first carburetors 54 includes a conventional air swirler 54b which receives a portion of the fuel 20 from a first tip 24a of the fuel injector 24 for mixing with a portion of the compressed air 16 and discharged through a tubular mixing can or mixer 54c, with the resulting fuel/air mixture 56 being discharged from the first outlet 54a into the combustion zone 40 wherein it is conventionally ignited for generating the combustion gases 26. Referring also to FIG. 3, several of the circumferentially spaced apart first carburetors 54 including their outlets 54a are illustrated in more particularity.

Figure 4:
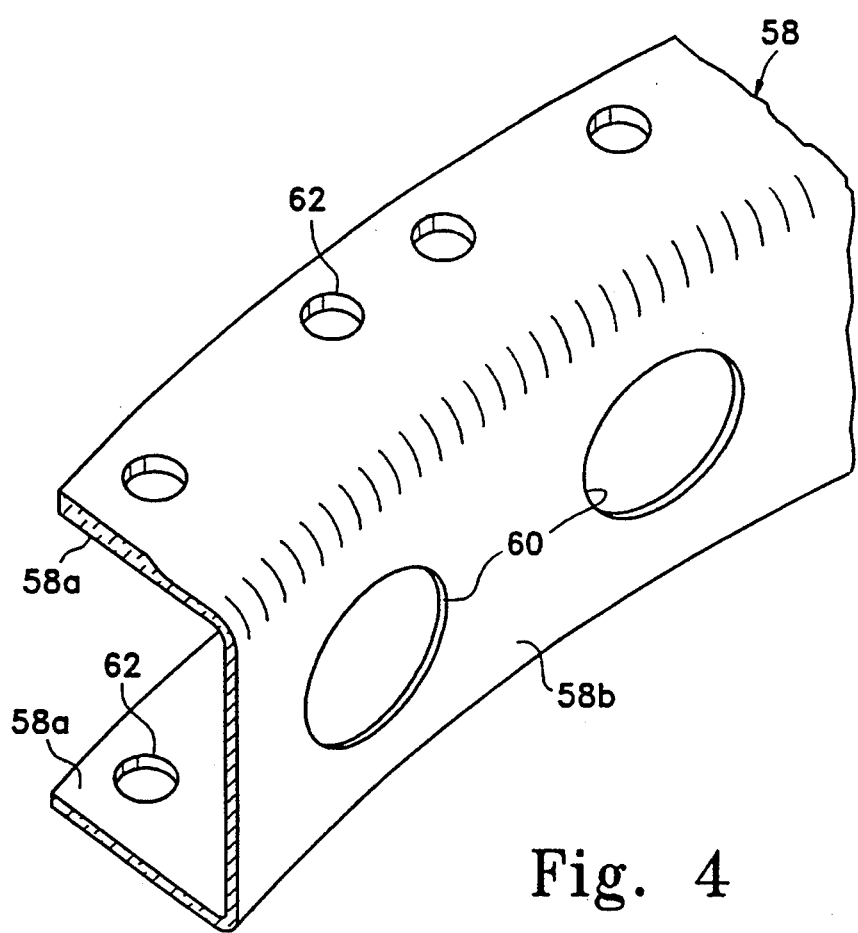
FIG. 4 is a perspective view of a portion of an exemplary one of the heat shields used in the combustor illustrated in FIG. 2.

In order to protect the metallic first dome 52 and the first carburetors 54 from the high temperature combustion gases 26, an annular first heat shield 58 mounted in accordance with the present invention is provided and includes a pair of radially spaced apart and axially extending first legs 58a, better shown in FIG. 4, which are integrally joined to a radially extending first base or face 58b in a generally U-shaped configuration, with the first face 58b facing in a downstream, aft direction toward the combustion zone 40. The first face 58b includes a plurality of circumferentially spaced apart first access ports 60 disposed concentrically with respective ones of the first outlets 54a for allowing the fuel/air mixture 56 to be discharged from the first carburetors 54 axially through the first heat shield 58. And, at least one, and preferably both, of the first legs 58a includes a plurality of circumferentially spaced apart and radially extending mounting holes 62, as best shown in FIG. 4, disposed adjacent to a respective mounting one, and in a preferred embodiment both, of the first flanges 52a.

As shown in FIG. 2, the top leg 58a is disposed radially above the top first flange 52a and predeterminedly spaced therefrom, and the bottom leg 58a is disposed radially below the bottom first flange 52a and suitably spaced therefrom. In order to mount the first heat shield 58 to the dome assembly 34, a plurality of circumferentially spaced apart mounting pins 64 are suitably fixedly joined to at least one of the first flanges 52a and extend radially through respective ones of the mounting holes 62 without interference or restraint therewith for allowing unrestrained differential thermal growth and contraction movement between the first heat shield 58 and the first dome 52 while supporting the first heat shield 58 against axial pressure loads thereon.

The outer diameter of the mounting pin 64 is suitably less than the inner diameter of the mounting hole 62, subject to conventional manufacturing tolerances, for allowing free radial movement of the mounting pin 64 through the mounting hole 62 subject solely to any friction therebetween where one or more portions of the mounting pins 64 slide against the mounting holes 62. As best shown in FIG. 2, the first dome 52 is, therefore, allowed to expand radially outwardly at a greater growth than the radially outwardly expansion of the annular first heat shield 58, with the mounting pins 64 sliding radially outwardly through the respective mounting holes 62. In this way, differential thermal movement between the first heat shield 58 and the first dome 52 is accommodated for preventing undesirable thermal stresses in the first heat shield 58 which could lead to its thermal distortion and damage thereof. However, the mounting pin 64 nevertheless supports the first heat shield 58 to the first dome 52 against pressure forces acting on the first heat shield 58 as well as vibratory movement thereof. For example, axial pressure forces across the first face 58b are reacted at least in part through the mounting pins 64 and transferred into the first dome 52 and in turn into the outer and inner frames 44, 48.

Since the first heat shield 58 is also preferably a nonmetallic material formed, for example, from a ceramic matrix composite, it is preferably imperforate between the mounting holes 62 and the ports 60 as best shown in FIG. 4. Accordingly, no film cooling holes are provided in the first heat shield 58 and, therefore, no spent film cooling air is injected into the combustion gases 26 which would lead to an increase in $NO_x$ emissions. However, a portion of the compressed air 16 may be suitably channeled against the back sides of the outer and inner liners 36, 38 as well as against the back side of the first heat shield 58 for providing cooling thereof, and then suitably reintroduced into the flowpath without increasing $NO_x$ emissions.

More specifically, and referring to FIG. 2, the combustor 18 preferably further includes an annular metallic impingement baffle suitably disposed between the first dome 52 and the first heat shield 58 and predeterminedly spaced therefrom. The baffle includes an aperture through which extends the mixing can 54c, and a plurality of conventional impingement holes therethrough for injecting a portion of the cooling air 16 in impingement against the first heat shield 58 for impingement cooling the back side thereof. However, the spent impingement air used for cooling the first heat shield 58 is preferably not injected directly into the combustion gases 26 within the combustion zone 40 to prevent an increase in $NO_x$ emissions. Instead, the ports 60 are preferably larger in diameter than the first outlets 54a for defining therebetween respective annular gaps for discharging therethrough the spent impingement air firstly used for impingement cooling of the first heat shield 58 concentrically around each outlet 54a for mixing with the fuel/air mixtures 56 being discharged from the first outlets 54a so that the spent impingement air is also used in the combustion process from the beginning and is not, therefore, reintroduced into the hot combustion gases 26 which would dilute the gases 26 and increase $NO_x$ emissions. The baffle is also generally U-shaped to match the configuration of the first heat shield 58 and provide a substantially uniform spacing therebetween for obtaining effective impingement cooling of the back side of the first heat shield 58.

As shown in FIGS. 2, and 3, at least one of the outer and inner liners 36, 38 includes a plurality of circumferentially spaced apart mounting holes at upstream ends thereof, and the pins 64 preferably additionally extend radially through the mounting holes for mounting both the first heat shield 58 and the outer liner 36 directly to the dome assembly 34 for allowing unrestrained differential thermal movement therebetween while supporting the first heat shield 58 and the outer liner 36 against axial pressure loads thereon. Just as the mounting pins 64 allow for differential thermal expansion and contraction between the metallic dome assembly 34 and the annular first heat shield 58, they also allow for differential thermal expansion relative to the annular outer liner 36.

However, although the outer and inner liners 36, 38 illustrated in FIG. 2 provide an improved combustor having low $NO_x$ capability, they are nevertheless full, 360° rings which are relatively large and therefore difficult and relatively expensive to manufacture. As unitary rings, they are also difficult to repair and will have relatively high scrap rates. Since the liners 36, 38 are preferably imperforate the temperature gradient radially therethrough will be relatively high which will create correspondingly high thermal stresses therein which will limit the useful life thereof. And, since the outer liner 36 is subject to buckling loads, it must have a suitable thickness and be suitably supported which further increases the complexity of the design.

Figure 5:
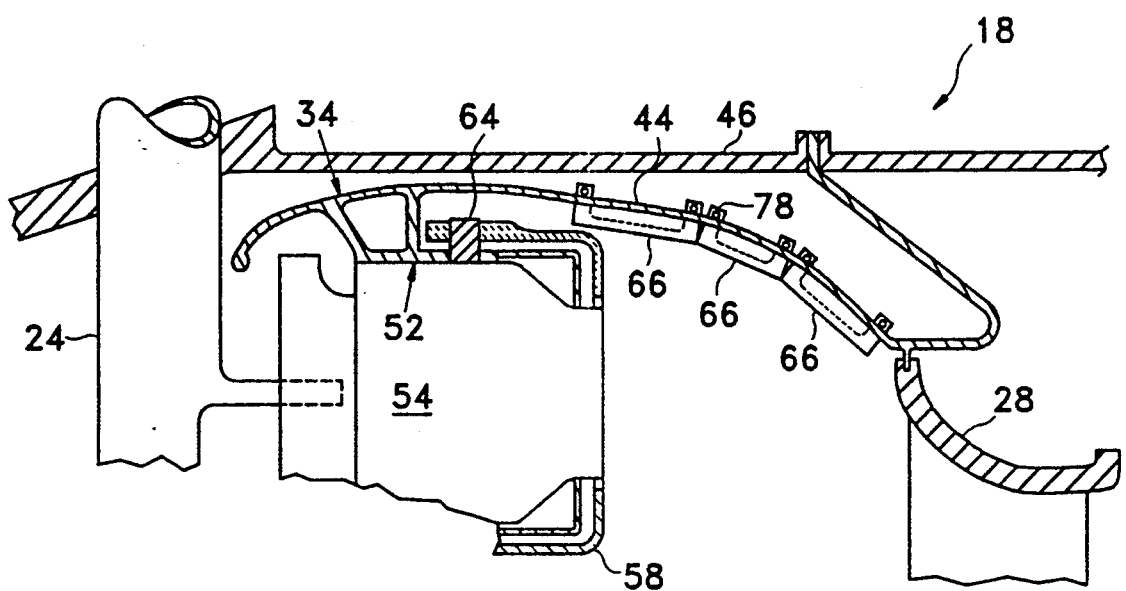
FIG. 5 is an enlarged partly sectional view of the outer portion of the combustor illustrated in FIG. 2 showing a segmented combustor liner mounted to a frame in accordance with one embodiment of the present invention.

Accordingly, FIG. 5 illustrates the combustor 18 having a segmented combustor liner assembly in accordance with a first embodiment of the present invention. The segmented liner is illustrated, for example, with respect to the outer liner of the combustor 18 with it being understood that it applies equally as well to the inner liner.

More specifically, the combustor 18 illustrated in FIG. 5 includes one or more axial rows, each including a plurality of circumferentially adjoining liner segments 66, with three exemplary rows being illustrated in FIG. 5. In the embodiment of the invention illustrated in FIG. 5, the liner segments 66 are each directly joined to the outer frame 44 to collectively define the outer liner of the combustor 18 and are not joined to the dome assembly 34 by the pins 64 in the embodiment illustrated in FIG. 2.

Figure 6:
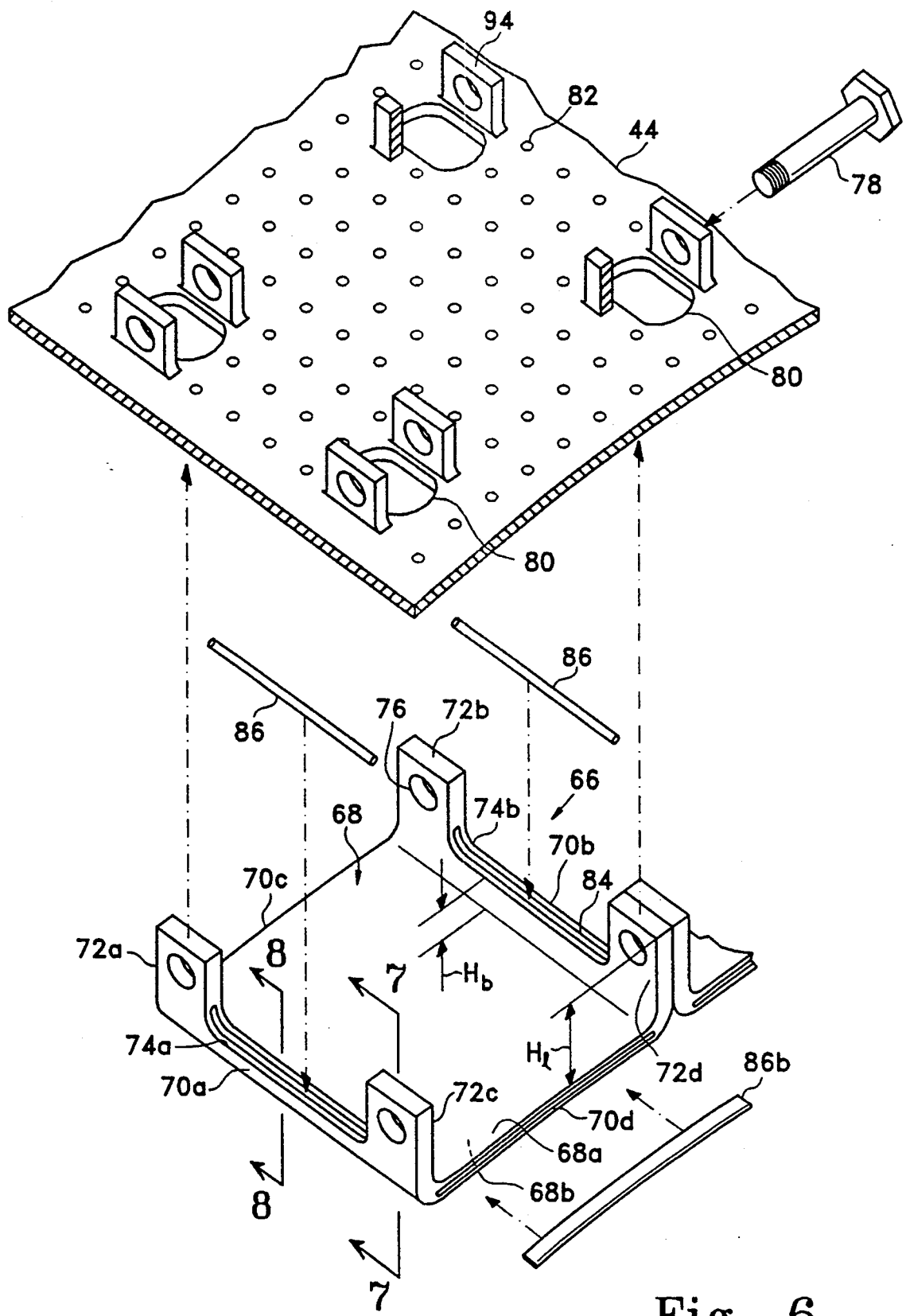
FIG. 6 is an exploded view of a portion of the frame illustrated in FIG. 5 showing the assembly thereto of an exemplary one of the liner segments in accordance with a first embodiment of the present invention.

FIG. 6 illustrates in more particularity an exemplary one of the liner segments 66 and its assembly to the outer frame 44. The liner segments 66 preferably include an imperforate panel 68 having oppositely facing top and bottom surfaces 68a, 68b and four sidewalls forming a generally rectangular outer perimeter thereof including first and second opposite sidewalls 70a,b and third and fourth opposite sidewalls 70c,d. The top surface 68a faces radially outwardly, and the bottom surface 68b bounds the combustion gases 26. A plurality of integral supporting legs or lugs are disposed substantially perpendicularly to the panel top surface 68a and extend from respective ones of the four sidewalls 70a–b, and, for example, include first and second lugs 72a, 72b extending from the first and second sidewalls 70a, 70b, respectively, at one end thereof, and third and fourth lugs 72c, 72d extending from the first and second sidewalls 70a, 70b, respectively, at opposite ends thereof. And, a plurality of integral standoffs or bosses are disposed substantially perpendicularly to the panel top surface 68a and extend from respective ones of the four sidewalls 70a–b, and include, for example, a first boss 74a disposed between the first and third lugs 72a, 72c, and a second boss 74b disposed between the second and fourth lugs 72b, 72d.

As shown in FIG. 6, the lugs 72a–d are preferably completely straight and identical to each other with each having a vertical height $H_l$ measured from the panel top surface 68a, and the bosses 74a,b are also identical to each other and have a vertical height $H_b$ measured from the panel top surface 68a. The bosses 74a,b are shorter than the lugs 72a–d, with the height $H_b$ being less than the height $H_l$.

Figure 7:
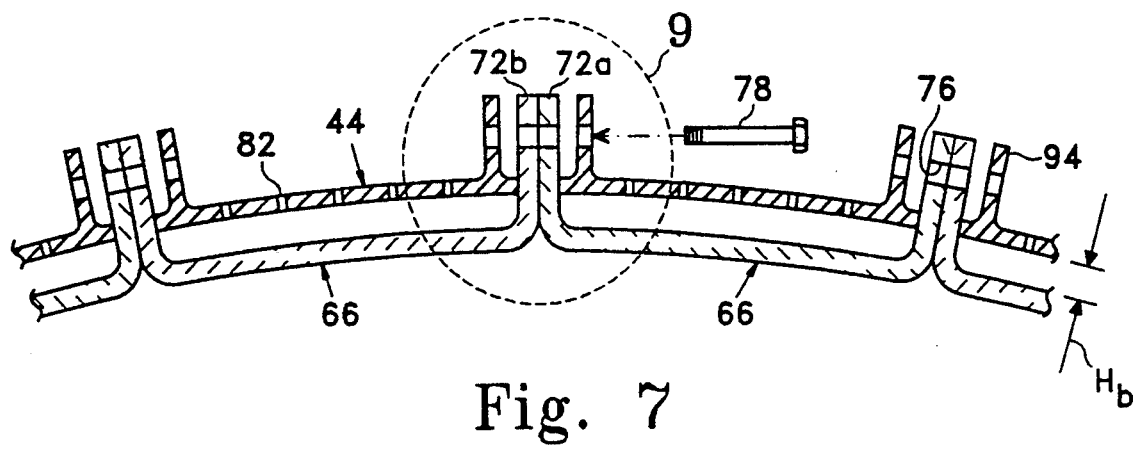
FIG. 7 is a transverse sectional view of the liner segments of FIG. 6 assembled to the frame and taken along line 7—7.
Figure 8:
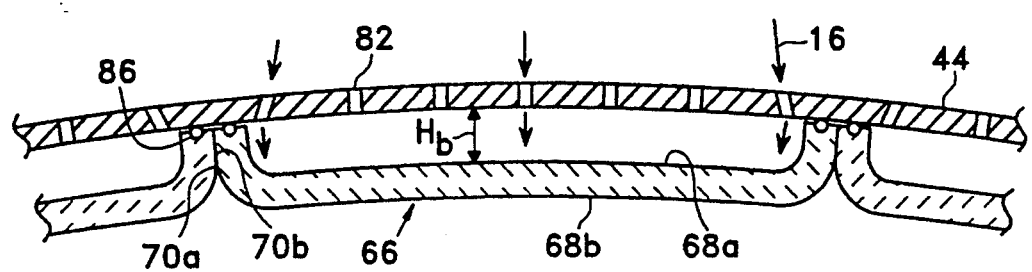
FIG. 8 is a sectional view of the liner segments joined to the frame in FIG. 6 and taken along line 8—8.
Figure 9:
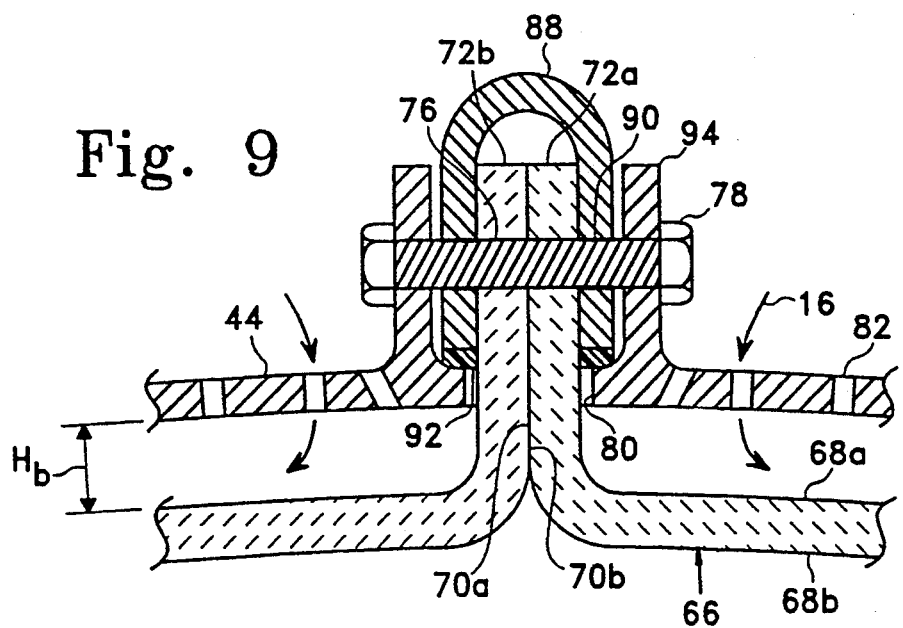
FIG. 9 is an enlarged detail view of adjoining lugs of adjacent liner segments joined to the frame by a fastener and seal assembly, within the dashed circle labeled 9 in FIG. 7.

As shown in FIG. 6, the lugs 72a–d are preferably disposed in pairs and aligned with each other on opposite ones of the four sidewalls 70a–d, with each of the lugs 72a–d including a retaining hole 76 at a distal end thereof for receiving a fastener 78 for supporting the liner segments 66 to the outer frame 44. The outer frame 44 is disposed coaxially with the circumferentially segmented liner assembly about the centerline axis 12 and includes a plurality of access or supporting holes 80, each receiving one or more respective ones of the lugs 72a–d, with the panel bosses 74a,b being disposed in abutting contact with the inner surface of the outer frame 44 for maintaining the panel top surface 68a at a predetermined spacing therefrom as illustrated in FIGS. 7–9. The lugs 72a–d independently support each liner segment 66 directly to the outer frame 44, and the bosses 74a,b ensure that a suitable gap or controlled spacing is maintained between the panel top surface 68a and the inner surface of the outer frame 44 for providing a constant impingement cooling distance for optimal cooling of the segments 66. The outer frame 44 preferably includes a plurality of axially and circumferentially spaced apart impingement holes 82 for channeling the cooling air 16 radially through the frame 44 in impingement against the panel top surface 68a for cooling the liner segments 66.

In the first embodiment illustrated in FIGS. 5–9, the liner segments 66 circumferentially adjoin each other to form one or more rows of annular, circumferentially segmented liner assemblies with adjacent ones of the panels 68 circumferentially abutting each other along respective ones of the first and second sidewalls 70a, 70b. In this way, the liner segments 66 are carried directly by the outer frame 44, and differential thermal expansion and contraction movement relative thereto is no longer a significant concern. Since the liner segments 66 are not a unitary annular structure, they do not expand and contract as a ring structure and, therefore, the resulting hoop and axial stresses therein are eliminated. Instead, each segment 66 is carried by the outer frame 44 and moves therewith as the outer frame 44 expands and contracts which substantially reduces stresses experienced by the individual segments 66.

However, leakage of spent impingement cooling air from between the outer frame 44 and the segments 66 should be preferably controlled or eliminated if possible. Accordingly, in the embodiment illustrated in FIG. 6, at least two of the opposite sidewalls 70a–d include slots 84 therein for receiving an elongate seal 86. The seal 86 may be made of any suitable material such as plastically deformable metal, e.g. conventional HS 188 or INCO 718, which when compressed between the seal slot 84 and the inner surface of the outer frame 14 as illustrated more clearly in FIG. 8, provides an effective seal for restricting leakage of the impingement cooling air circumferentially between adjacent ones of the segments 66 over the sidewalls 70a, 70b.

The two seal slots 84 in the embodiment illustrated in FIGS. 6 and 8 therefore extend along the first and second sidewalls 70a, 70b in the respective first and second bosses 74a, 74b between the first and third lugs 72a, 72c and the second and fourth lugs 72b, 72d, respectively, with the elongate seals 86 being disposed in sealing contact between the underside of the frame 44 and the bosses 74a, 74b for restricting leakage of the cooling air circumferentially therebetween. And, when more than one axial row of the liner segments 66 are used as shown in FIG. 5, suitable spline seals 86b are preferably used therebetween as shown in FIG. 6.

Figure 10:
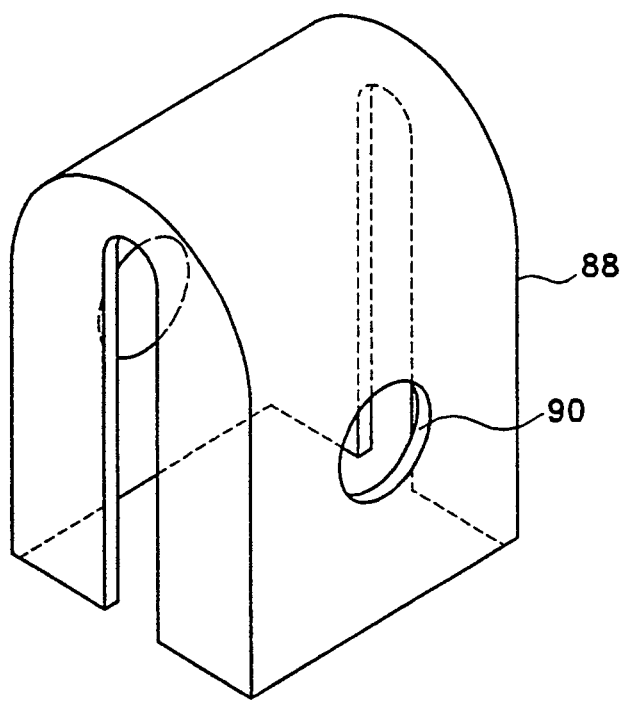
FIG. 10 is a perspective view of one of the U-shaped seals illustrated in FIG. 9 which is positionable over adjacent lugs for restricting leakage through the frame.

And, referring to FIGS. 9 and 10, additional means for sealing the lugs 72a–d in the frame supporting holes 80 are provided for restricting leakage of the cooling air 16 therethrough. In this exemplary embodiment, the sealing means include an inverted, generally U-shaped hollow cap 88 disposed over at least one of the distal ends of the lugs 72a–d and the frame supporting hole 80. The cap 88 is made of a suitable metal such as conventional INCO 718, and each cap 88 includes an aperture 90 therethrough aligned with the lug retaining holes 76 for receiving therethrough a respective one of the fasteners 78. A suitable rectangular, radially compressible seal 92 as shown in FIG. 9, similar in material to seal 86, may be disposed between the bottom of the cap 88 around the perimeter of the supporting hole 80 for further sealing the frame 44 at the hole 80 to restrict leakage therethrough. Although the cap 88 could be used alone for supporting the lugs 72a–d to the outer frame 44, in the embodiment illustrated in FIGS. 6, 7, and 9, the outer frame 44 includes a plurality of integral support flanges 94 having apertures therein for receiving the fasteners 78 for securely mounting the liner segments 66 to the outer frame 44.

Although each of the lugs 72a–d could be independently mounted to the outer frame 44, in the preferred embodiment illustrated in FIG. 9, for example, the first and second lugs 72a,b of circumferentially adjacent ones of the segments 66 circumferentially abut each other and extend together through a respective one of the frame supporting holes 80. And, the cap 88 is configured for enclosing both first and second lugs 72a,b for restricting leakage of the cooling air 16 between the abutting lugs 72a,b and through the supporting holes 80.

Illustrated in FIGS. 11–15 is another embodiment of the invention having liner segments 96 forming the outer liner joined to the outer frame 44 of the combustor 18 with a similar arrangement also being used for the inner liner if desired. The liner segments 96 are substantially similar in configuration and function to the liner segments 66 described above except for the following exemplary differences. Whereas the liner segments 66 described above included the four lugs 72-d with two bosses 74a,b and the seals 86 disposed therein, the liner segments 96 illustrated in FIG. 12, for example, includes two lugs 72a, 72b, four bosses 74a–d, and two seals 86.

More specifically, the liner segments 96 are similarly disposed in axially adjoining rows of respective pluralities of circumferentially adjoining liner segments 96, with each segment 96 being supported by the outer frame 44. Each liner segment 96 includes the first lug 72a extending from the center of the third sidewall 70c, and the second lug 72b extends from the center of the fourth sidewall 70d, which sidewalls 70c,d are axially spaced apart from each other in the combustor 18. Each segment 96 also includes the first boss 74a at one circumferential end of the third sidewall 70c, the second boss 74b is disposed at an opposite circumferential end of the third sidewall 70c, and further includes a third boss 74c at one circumferential end of the fourth sidewall 70d and axially aligned with the first boss 74a along the first sidewall 70a, and a fourth boss 74d at an opposite circumferential end of the fourth sidewall 70d and axially aligned with the second boss 74b along the second sidewall 70b.

Figure 11:
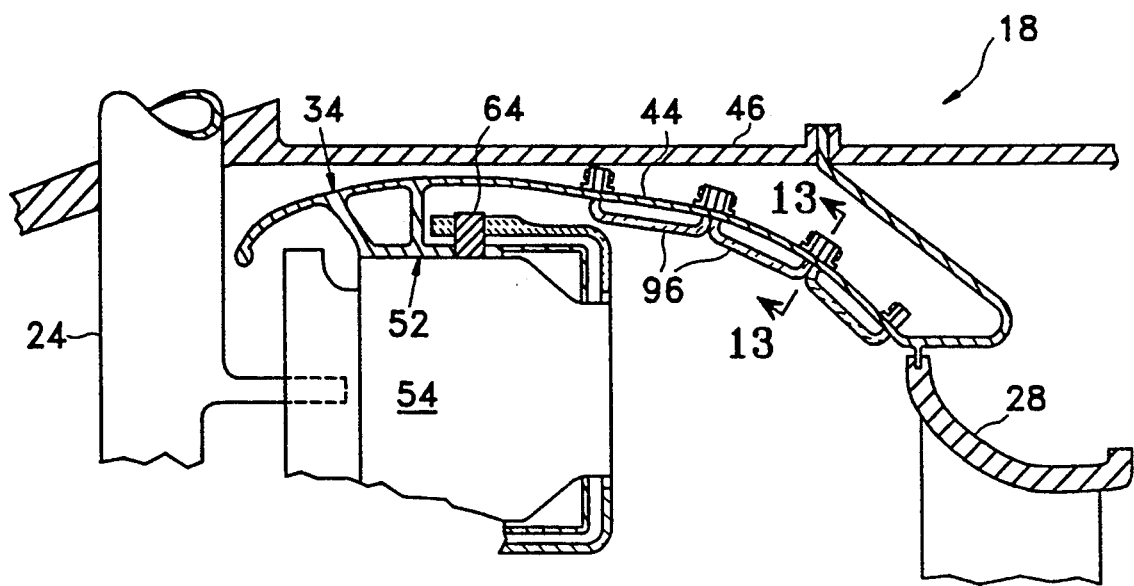
FIG. 11 is an enlarged, partly sectional view of the top portion of the combustor illustrated in FIG. 2 showing a segmented liner assembly in accordance with a second embodiment of the present invention.
Figure 13:
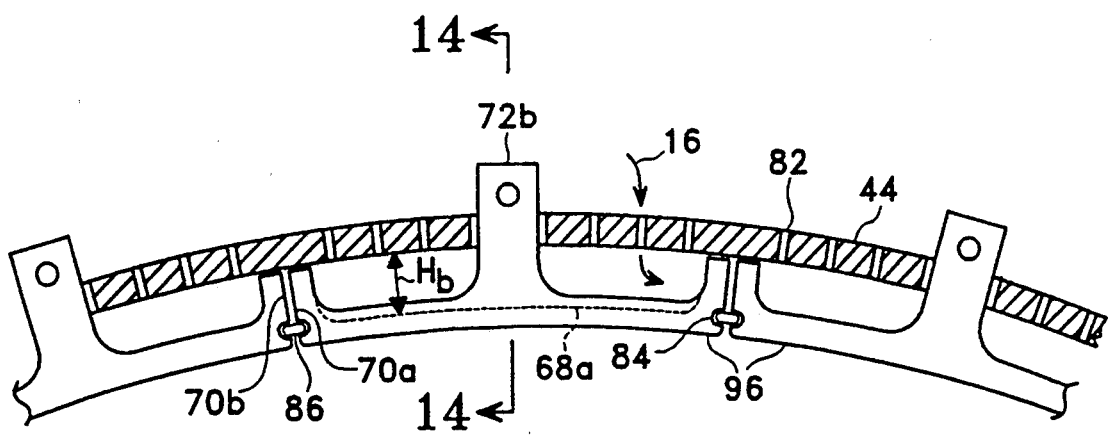
FIG. 13 is a partly sectional, upstream facing axial view of a portion of the segmented outer combustor liner illustrated in FIG. 11 and taken along line 13—13.
Figure 14:
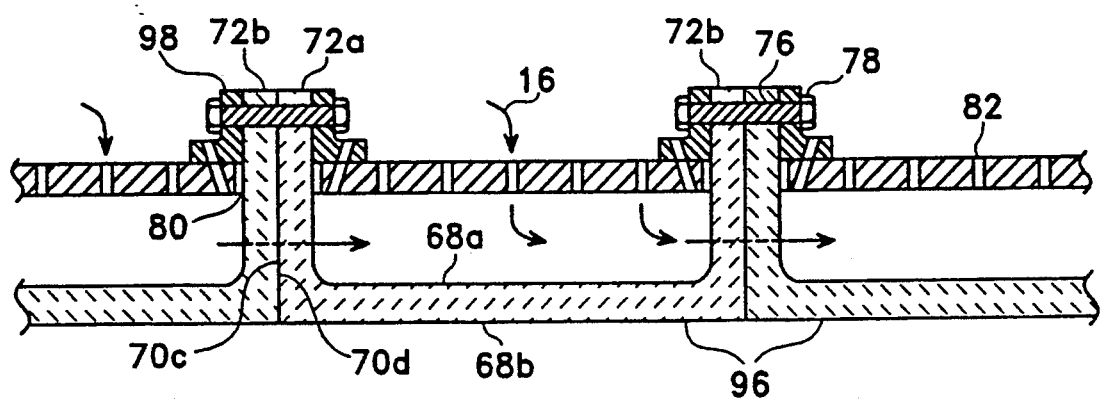
FIG. 14 is an enlarged sectional view of the outer liner segments joined to the outer frame illustrated in FIG. 13 and taken along line 14—14.

As shown in FIGS. 11 and 14, the circumferentially adjoining liner segments 96 define three exemplary axial rows thereof, with the first and second lugs 72a, 72b of axially adjacent ones of the segments 96 abutting each other and extending together through a respective one of the supporting holes 80. And, in the circumferential direction as illustrated in FIG. 13, for example, opposing first and second sidewalls 70a, 70b of adjacent ones of the liner segments 96 include the seal slots 84 facing circumferentially, with each slot 84 including an axially elongate seal 86 therein for restricting leakage of the cooling air 16 radially between the adjacent liner segments 96. However, the cooling air 16 is nevertheless allowed to flow circumferentially above the first and second sidewalls 70a, 70b and between the respective axially spaced apart lugs 74a-d for spreading the cooling air 16 circumferentially around the outer surfaces of the segments 96. And, as shown in FIG. 14, since respective third and fourth sidewalls 70c, 70d of axially adjacent ones of the liner segments 96 abut each other, a suitable seal is created therebetween for restricting radial leakage of the cooling air therebetween. However, the elevated bosses 74a-d still allow the cooling air 16 to flow axially above the third and fourth sidewalls 70c, 70d and between the circumferentially spaced apart lugs 74a-d for continuing its flow axially downstream over the segments 96.

Figure 15:
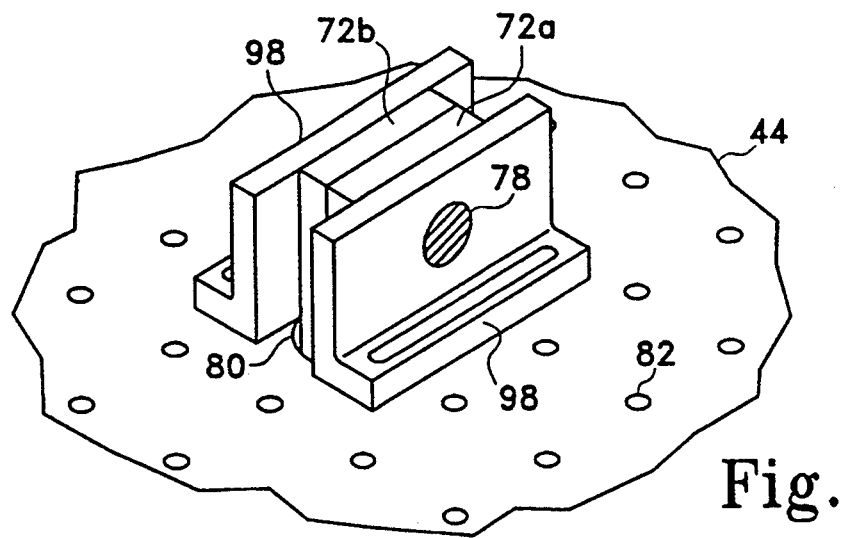
FIG. 15 is an enlarged, partly sectional perspective view of a portion of the outer frame and exemplary adjoining lugs supported thereto.

As shown in FIGS. 14 and 15, sealing means are also provided at the respective pairs of first and second lugs 72a, 72b of adjacent liner segments 96 where they pass together through the respective supporting holes 80 for restricting leakage of the cooling air 16 therethrough. In this exemplary embodiment, a pair of generally L-shaped retaining flanges 98 straddle at least one, and in the embodiment illustrated in FIG. 15, two of the lugs 72a, 72b on opposite sides thereof, with distal ends of the flanges 98 including apertures therethrough aligned with the lug retaining holes 76 and receiving therethrough a respective one of the fasteners 78. Proximal ends of the flanges 98 are disposed in sliding abutting contact with the outer surface of the frame 44 over at least part if not all of the exposed supporting hole 80 for restricting leakage therethrough.

Figure 12:
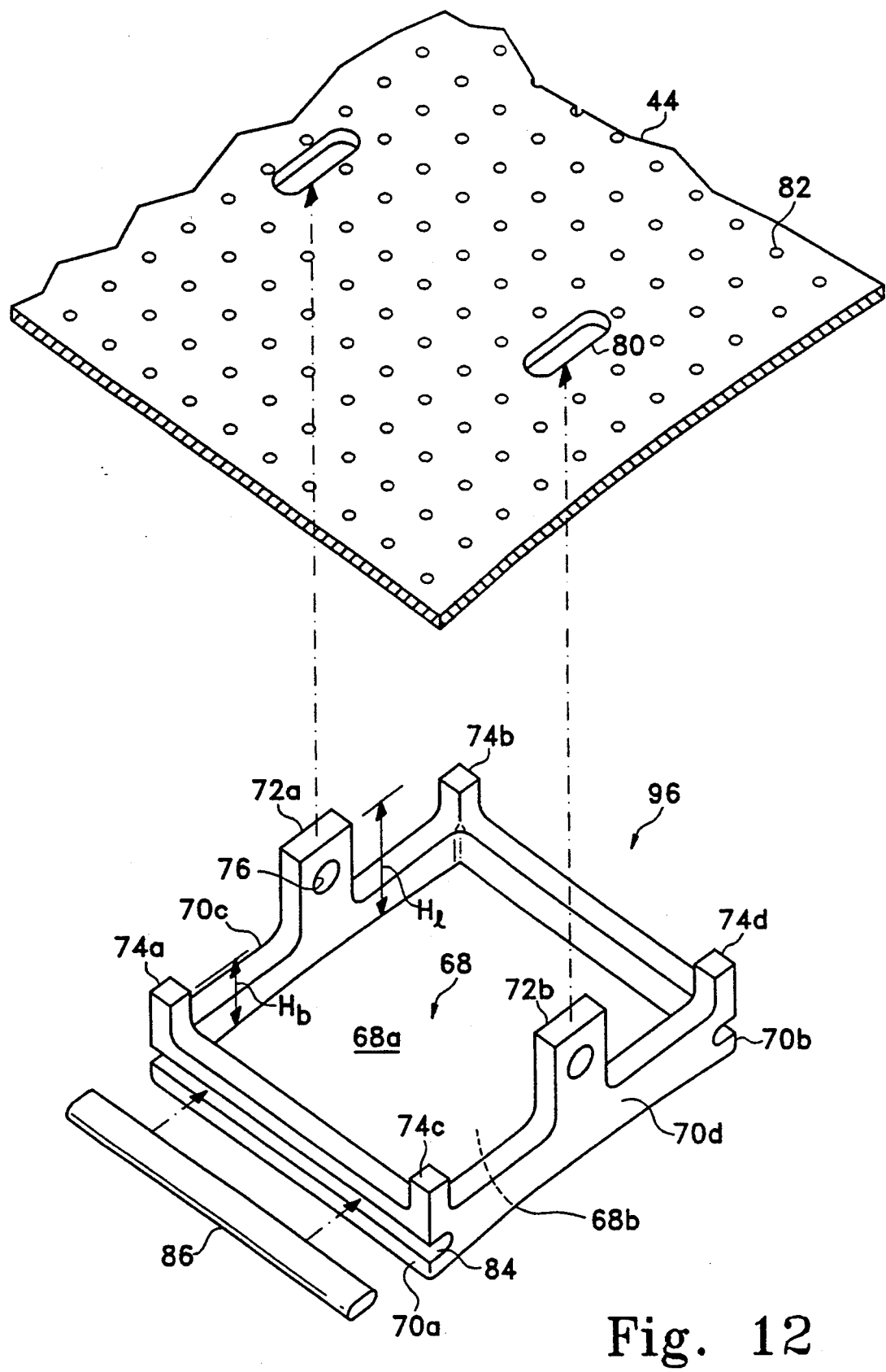
FIG. 12 is an exploded view of an exemplary one of the liner segments illustrated in FIG. 11 showing its assembly with the frame.
Figure 16:
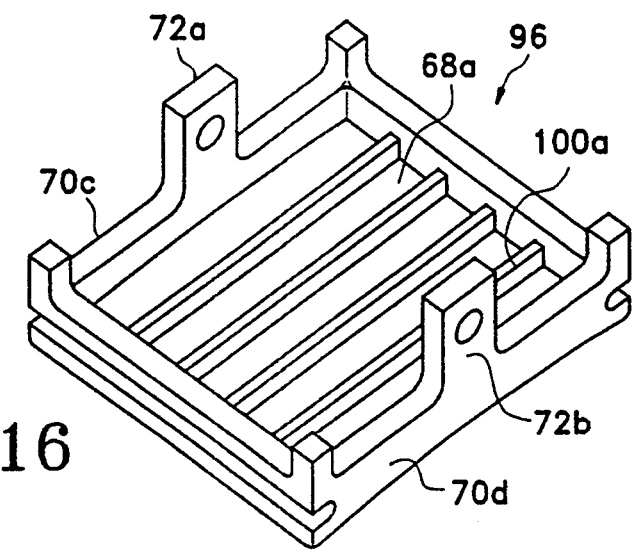
FIG. 16 is a perspective view of the liner segment illustrated in FIG. 12 showing parallel ribs integrally joined to the top surface thereof in an alternate embodiment.
Figure 17:
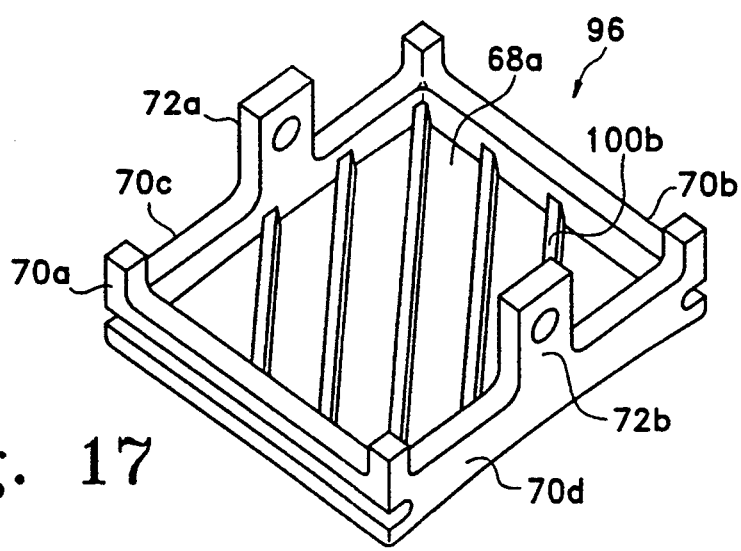
FIG. 17 is a perspective view of the liner segment illustrated in FIG. 12 showing oblique ribs integrally joined to the top surface thereof in an alternate embodiment.
Figure 18:
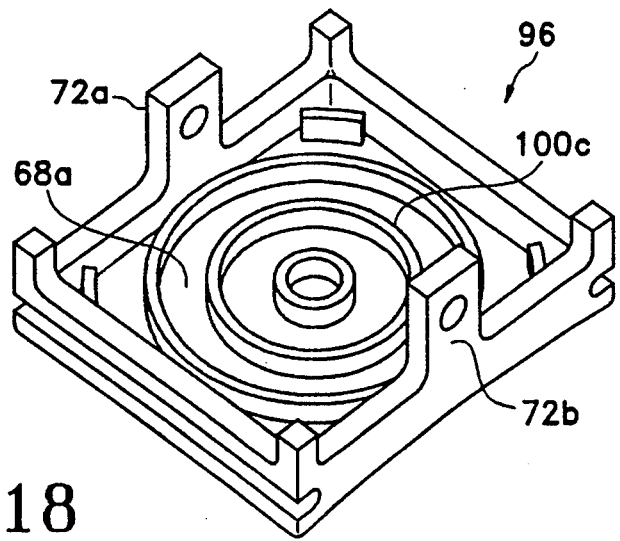
FIG. 18 is a perspective view of the liner segment illustrated in FIG. 12 showing concentric ribs integrally joined to the top surface thereof in an alternate embodiment.

In FIG. 12, the panel top surface is flat, but as illustrated in FIGS. 16-18, the panel top surfaces 68a may include a plurality of ribs 100a-c integral thereon which provide additional stiffening and cooling surface area for the liner segments 96, as well as for the segments 66 described above. In FIG. 16, the ribs 100a are preferably substantially straight and disposed parallel to each other and parallel to the third and fourth sidewalls 70c, 70d, for example. In FIG. 17, the ribs 100b are also preferably straight and parallel to each other, but disposed obliquely, for example 45° to all four sidewalls 70a-d. And, in FIG. 18, the ribs are preferably annular or circular and disposed concentrically with each other and centered in the liner segment 96. In this way, the panels 68 themselves may be made relatively thin, with structural rigidity provided to the liner segment 96 using the ribs 100a-c. And, the ribs increase the cooling surface area of the segments 96 to provide enhanced cooling.

Figure 19:
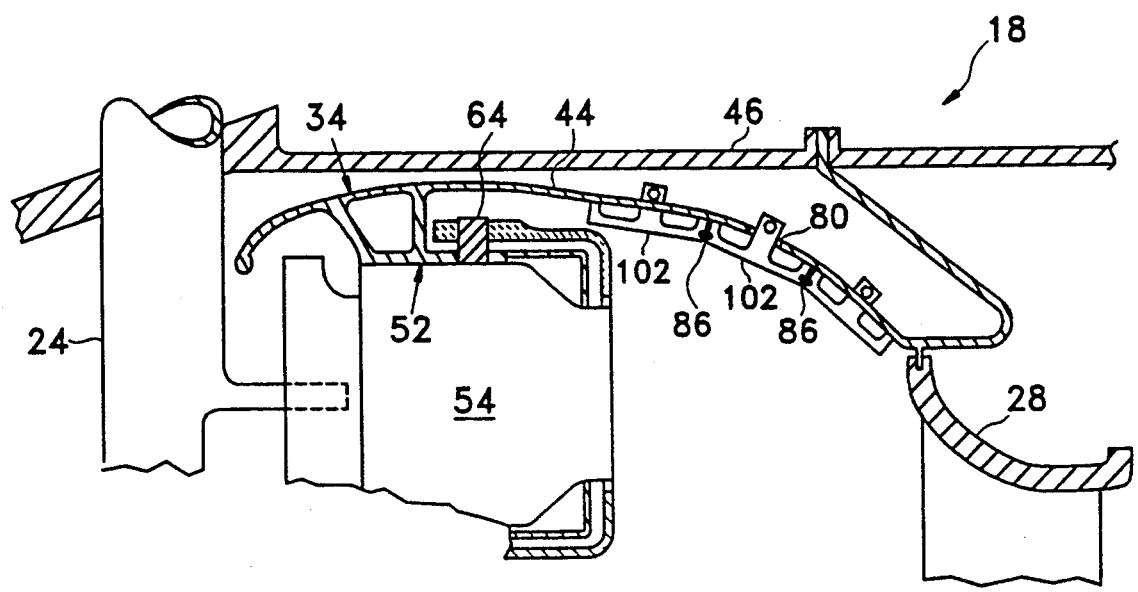
FIG. 19 is an enlarged, partly sectional view of the outer portion of the combustor illustrated in FIG. 2 showing a segmented liner assembly in accordance with a third embodiment of the present invention.
Figure 20:
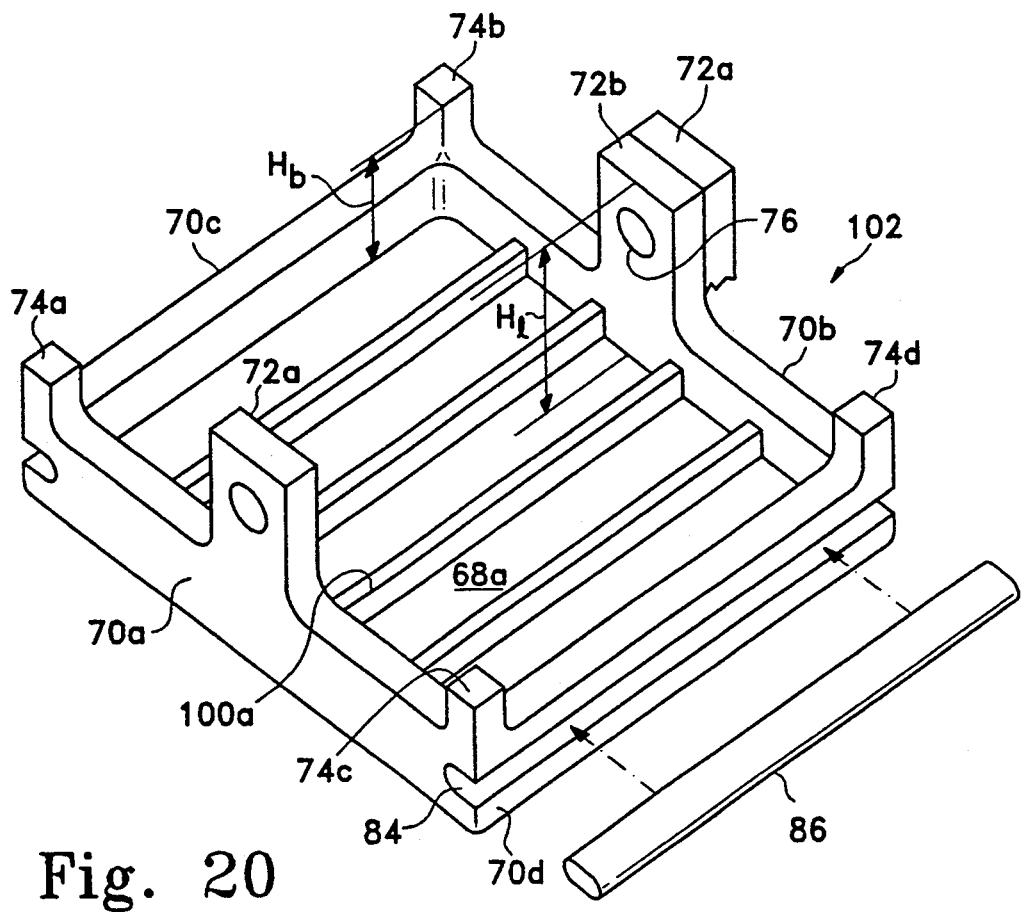
FIG. 20 is a perspective view of an exemplary liner segment joinable to the frame in FIG. 19.

FIGS. 19 and 20 illustrated a segmented combustor in accordance with a third embodiment of the present invention which is substantially similar to the embodiment described above with respect to FIGS. 11-18 except for several significant changes. More specifically, this third embodiment includes liner segments 102 wherein the first lug 72a extends from the center of the first sidewall 70a, and the second lug 72b extends from the center of the second sidewall 70b circumferentially spaced apart therefrom, with the first and second lugs 72a, 72b of circumferentially adjacent ones of the segments 102 abutting each other and extending together through a respective one of the supporting holes 80. The first boss 74a is disposed at one axial end of the first sidewall 70a, the second boss 74b is disposed at a corresponding axial end of the second sidewall 70b, the third boss 74c is disposed at an opposite axial end of the first sidewall 70a, and the fourth boss 74d is disposed at a correspondingly opposite axial end of the second sidewall 70b. In this embodiment, the segments 102 circumferentially abut each other for channeling therebetween over the panel top surfaces 68a the cooling air 16 first used for impingement cooling of the segments 102.

As shown in FIGS. 19 and 20, the liner segments 102 are similarly disposed in axial rows of circumferentially adjoining segments 102, with opposing third and fourth sidewalls 70c, 70d of liner segments 102 of the first and second rows including the seal slots 84 and circumferentially elongate seals 86 therein for restricting leakage of the cooling air 16 therebetween. Note that in the FIG. 20 embodiment, the two lugs 72a,b are circumferentially spaced apart; in the FIG. 12 embodiment, the two lugs 72a,b are axially spaced apart; and in the FIG. 6 embodiment, the four lugs 72a-d are both circumferentially and axially spaced apart at the four corners of the panel 68.

In the several embodiments disclosed above, the individually supported liner segments 66, 96, and 102 enjoy the similar benefits of eliminating thermal hoop and axial stresses which would otherwise occur in a continuous, unitary annular liner which bounds the hot combustion gases 26. The segments are carried along with the thermal expansion and contraction of the frame 44 which eliminates differential thermal stresses which would otherwise occur. The segments are individually made, assembled, and removable which decreases the cost of manufacture, assembly, and repair. And, to eliminate any leakage of the cooling air first used for impingement cooling of the respective segments, the various seals described above may be used singly or in various combinations as required.

In those configurations where adjacent lugs are fastened together, the corresponding sidewalls abut each other for providing an effective seal. For those sidewalls not having joined adjacent lugs, the spline-type seals 86 disclosed above may be used to provide effective sealing. And, the perpendicularly extending relatively straight lugs 72a-d are relatively easy to manufacture especially wherein the liner segments are non-metallic and preferably ceramic matrix composite materials. The lugs 72a-d also provide a simple and effective means for mounting the segments to the frame 44 through the cooperating supporting holes 80. Although various embodiments have been disclosed above for fastening the lugs 72a-d to the frame 44, other fastening means wherein the lugs 72a-d are joined to the frame 44 may also be used in accordance with the present invention. And, the abutting lugs 72a-d may also include radial grooves therein for suitably channeling a portion of the cooling 16 for directly cooling the lugs 72a-d themselves.

In the several embodiments disclosed above having two or more axial rows of liner segments, axially adjacent liner segments may be either axially aligned with each other, or staggered circumferentially between rows like overlapping bricks in a wall.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

It is claimed:

1. A combustor liner segment for bounding combustion gases in a gas turbine engine combustor comprising:
    a panel having top and bottom surfaces and bounded by first and second opposite sidewalls and third and fourth opposite sidewalls forming a rectangular outer perimeter thereof;
    a plurality of integral supporting lugs disposed substantially perpendicularly to said panel top surface and extending from respective ones of said four sidewalls; and
    a plurality of integral bosses disposed substantially perpendicularly to said panel top surface and extending from respective ones of said four sidewalls, said bosses being shorter than said lugs.

2. A segment according to claim 1 wherein said lugs are disposed in pairs and aligned with each other on opposite ones of said four sidewalls, and each of said lugs includes a retaining hole at a distal end thereof for receiving a fastener.

3. A segment according to claim 2 wherein at least two of said opposite sidewalls include slots disposed therein for receiving an elongate seal.

4. A segment according to claim 3 further comprising a plurality of said liner segments circumferentially adjoining each other to form an annular, circumferentially segmented liner assembly, with adjacent ones of said panels circumferentially abutting each other along respective ones of said first and second sidewalls.

5. A segmented liner assembly according to claim 4 in combination with an annular frame disposed coaxially therewith about a centerline axis, said frame including a plurality of supporting holes each receiving a respective one of said lugs, with said panel bosses being disposed in abutting contact with said frame for maintaining said panel top surface at a predetermined spacing therefrom.

6. An apparatus according to claim 5 wherein said frame includes a plurality of spaced apart impingement holes for channeling cooling air radially through said frame in impingement against said panel top surfaces, and further including means for sealing said lugs in said frame supporting holes for restricting leakage of said cooling air therethrough.

7. An apparatus according to claim 6 wherein said sealing means include an inverted, generally U-shaped cap disposed over at least one of said lug distal ends and said frame supporting hole, and having an aperture therethrough aligned with said lug retaining hole and receiving therethrough a respective one of said fasteners.

8. An apparatus according to claim 6 wherein said sealing means include a pair of generally L-shaped retaining flanges straddling at least one of said lugs on opposite sides thereof, with distal ends of said retaining flanges including apertures therethrough aligned with said lug retaining hole and receiving therethrough a respective one of said fasteners, and proximal ends thereof being disposed in sliding abutting contact with said frame over said frame supporting hole.

9. An apparatus according to claim 6 wherein said lugs include a first lug extending from said first sidewall, and a second lug extending from said second sidewall, and first and second lugs of circumferentially adjacent ones of said segments abut each other and extend together through a respective one of said frame supporting holes.

10. An apparatus according to claim 6 wherein said lugs include a first lug extending from said third sidewall, and a second lug extending from said fourth sidewall.

11. An apparatus according to claim 6 wherein said lugs include first and second lugs extending from said first and second sidewalls, respectively, at one end thereof, and third and fourth lugs extending from said first and second sidewalls, respectively, at opposite ends thereof, and said bosses are disposed between said first and third lugs and between said second and fourth lugs, respectively.

12. An apparatus according to claim 11 wherein said two seal slots extend along said first and second sidewalls in said bosses between said first and third and said second and fourth lugs, respectively, and include said elongate seals disposed in sealing contact between said frame and said bosses for restricting leakage of said cooling air circumferentially therebetween.

13. An apparatus according to claim 6 wherein:
    said lugs include a first lug extending from the center of said first sidewall, and a second lug extending from the center of said second sidewall, and first and second lugs of circumferentially adjacent ones of said segments abut each other and extend together through a respective one of said frame supporting holes;
    said bosses include a first boss at one end of said first sidewall, a second boss at a corresponding one end of said second sidewall, a third boss at an opposite end of said first sidewall, and a fourth boss at a corresponding opposite end of said second sidewall; and
    said segments circumferentially abut each other for channeling therebetween over said panel top surfaces said cooling air first used for impingement cooling said segments.

14. An apparatus according to claim 13 wherein said liner segments define a first row, and further including a second row of said circumferentially abutting segments disposed axially adjacent to said first row, with opposing third and fourth sidewalls of said liner segments of said first and second rows including said seal slots and elongate seals therein for restricting leakage of said cooling air therebetween.

15. An apparatus according to claim 6 wherein:
    said lugs include a first lug extending from the center of said third sidewall, and a second lug extending from the center of said fourth sidewall;
    said bosses include a first boss at one end of said third sidewall, a second boss at an opposite end of said third sidewall, a third boss at one end of said fourth sidewall, and a fourth boss at an opposite end of said fourth sidewall; and
    said segments circumferentially abut each other for channeling therebetween over said panel top surfaces said cooling air first used for impingement cooling said segments.

16. An apparatus according to claim 15 wherein said liner segments define a first row, and further including a second row of said circumferentially abutting segments disposed axially adjacent to said first row, with said first and second lugs of axially adjacent ones of said segments abutting each other and extending together through a respective one of said supporting holes; and opposing first and second sidewalls of said liner segments of said first and second rows include said seal slots and elongate seals therein for restricting leakage of said cooling air therebetween.

17. An apparatus according to claim 6 wherein said panel top surfaces include a plurality of ribs thereon.

18. An apparatus according to claim 17 wherein said ribs are straight and disposed parallel to each other.

19. An apparatus according to claim 17 wherein said ribs are annular and concentric to each other.

* * * * *